US012348744B2

(12) United States Patent
Zhu et al.

(10) Patent No.: US 12,348,744 B2
(45) Date of Patent: Jul. 1, 2025

(54) PARALLEL ENCODING AND DECODING METHOD AND APPARATUS, COMPUTER DEVICE, AND STORAGE MEDIUM

(71) Applicant: Glenfly Tech Co., Ltd., Shanghai (CN)

(72) Inventors: Chuanchuan Zhu, Shanghai (CN); Shilin Yan, Shanghai (CN); Jin Shao, Shanghai (CN); Cong Ji, Shanghai (CN)

(73) Assignee: Glenfly Tech Co., Ltd., Shanghai (CN)

( * ) Notice: Subject to any disclaimer, the term of this patent is extended or adjusted under 35 U.S.C. 154(b) by 129 days.

(21) Appl. No.: 18/238,909

(22) Filed: Aug. 28, 2023

(65) Prior Publication Data

US 2024/0323418 A1 Sep. 26, 2024

(30) Foreign Application Priority Data

Mar. 23, 2023 (CN) ........................ 202310293798.2

(51) Int. Cl.
*H04N 19/436* (2014.01)
*H04N 19/105* (2014.01)
*H04N 19/176* (2014.01)

(52) U.S. Cl.
CPC ......... *H04N 19/436* (2014.11); *H04N 19/105* (2014.11); *H04N 19/176* (2014.11)

(58) Field of Classification Search
CPC ... H04N 19/436; H04N 19/105; H04N 19/176
See application file for complete search history.

(56) References Cited

U.S. PATENT DOCUMENTS

2005/0204210 A1 9/2005 Lobo et al.
2008/0159408 A1 7/2008 Degtyarenko
(Continued)

FOREIGN PATENT DOCUMENTS

CN 101710986 A 5/2010
CN 106921862 A 7/2017
(Continued)

OTHER PUBLICATIONS

Yu et al., "Multi-Grain Parallel H.264 Encoder for Homogeneous Multi-Core Architectures", Chinese Journal of Computers, Jun. 2009, vol. 32, No. 6; 1100-1109 pp.
(Continued)

*Primary Examiner* — Kyle M Lotfi
(74) *Attorney, Agent, or Firm* — NIXON PEABODY LLP

(57) ABSTRACT

Disclosed are parallel encoding and decoding method and apparatus, a computer device, a storage medium, and a computer program product. The method includes: acquiring a synchronization node corresponding to a codec core, and transmitting a frame synchronization detection request to the synchronization node based on a frame to be encoded and decoded; acquiring a frame synchronization result corresponding to the frame synchronization detection request; and determining a encoding and decoding mode for the frame to be encoded and decoded based on the frame synchronization result, and encoding and decoding the frame to be encoded and decoded based on the encoding and decoding mode. By using the method, a plurality of codec cores can be employed to code and decode different frames in the same video in parallel, thereby improving the frame rate.

9 Claims, 6 Drawing Sheets

(56) References Cited

U.S. PATENT DOCUMENTS

| | | | | |
|---|---|---|---|---|
| 2011/0194617 | A1 | 8/2011 | Kumar et al. | |
| 2012/0121196 | A1 | 5/2012 | Kim et al. | |
| 2012/0230391 | A1 | 9/2012 | Huang et al. | |
| 2022/0210422 | A1* | 6/2022 | Esenlik | H04N 19/119 |

FOREIGN PATENT DOCUMENTS

| | | | |
|---|---|---|---|
| CN | 109218722 | A | 1/2019 |
| CN | 111093078 | A | 5/2020 |

OTHER PUBLICATIONS

Wei et al., "Study of Multi—thread Parallel Coding Based on X264", Digital Video; Video Engineering, 1002-8692 (2011) 19-0007-04, 4 pp.

CN Office Action for Application No. 2023102937982, mailed Jan. 11, 2024, 13 pp.

* cited by examiner

PARALLEL ENCODING AND DECODING METHOD AND APPARATUS, COMPUTER DEVICE, AND STORAGE MEDIUM

CROSS REFERENCES TO RELATED APPLICATION

The present application claims priority to Chinese patent application No. 202310293798.2, titled "Parallel Encoding and Decoding Method and Apparatus, Computer Device, and Storage Medium", and filed on Mar. 23, 2023, the content of which is hereby incorporated by reference in its entirety.

TECHNICAL FIELD

The present disclosure relates to the field of image processing technology, and particularly to a parallel encoding and decoding method and apparatus, a computer device, a storage medium and a computer program product.

BACKGROUND

With the continuous development of the video technique and the continuous enhancement of the hardware processing capabilities, the requirements for performance of video codec are also increasing.

In the conventional techniques, the single-core codec is typically used, that is, a single-channel video is assigned to a video codec core for encoding and decoding.

However, as the resolution of the video evolves from the Full High Definition (FHD) to Ultra High Definition (UHD), the number of frames that need to be encoded and decoded per second has increased dramatically. The frame rates implemented by the single-core codec are difficult to meet the requirements of the frame rates at higher resolutions.

SUMMARY

In view of this, as for the technical problem described above, it is necessary to provide a parallel encoding and decoding method and apparatus, a computer device, a computer-readable storage medium, and a computer program product capable of improving the frame rate.

In the first aspect of the present disclosure, a parallel encoding and decoding method is provided, including: acquiring a synchronization node corresponding to a codec core, and transmitting a frame synchronization detection request to the synchronization node based on a frame to be encoded and decoded; acquiring a frame synchronization result corresponding to the frame synchronization detection request; and determining a encoding and decoding mode for the frame to be encoded and decoded based on the frame synchronization result, and encoding and decoding the frame to be encoded and decoded based on the encoding and decoding mode.

In an embodiment, the frame synchronization result corresponds to a status of a reference frame of the frame to be encoded and decoded. The determining the encoding and decoding mode for the frame to be encoded and decoded based on the frame synchronization result, and encoding and decoding the frame to be encoded and decoded based on the encoding and decoding mode includes: when the frame synchronization result corresponds to a first status of the reference frame, acquiring data of the reference frame corresponding to the frame to be encoded and decoded, and encoding and decoding the frame to be encoded and decoded based on the data of the reference frame. The first status indicates that the reference frame corresponding to the frame to be encoded and decoded has been encoded and decoded completely.

In an embodiment, the frame synchronization result corresponds to a status of a reference frame of the frame to be encoded and decoded. The determining the encoding and decoding mode for the frame to be encoded and decoded based on the frame synchronization result, and encoding and decoding the frame to be encoded and decoded based on the encoding and decoding mode includes: when the frame synchronization result corresponds to a second status of the reference frame, performing a block synchronization detection on a code-block corresponding to the frame to be encoded and decoded, and obtaining a block synchronization result, the second status indicating that the frame to be encoded and decoded and the reference frame corresponding to the frame to be encoded and decoded are being encoded and decoded in parallel; and when the block synchronization result satisfies a preset condition, acquiring data of the reference frame corresponding to the frame to be encoded and decoded, and encoding and decoding the frame to be encoded and decoded based on the data of the reference frame.

In an embodiment, the performing the block synchronization detection on the code-block corresponding to the frame to be encoded and decoded, and obtaining the block synchronization result includes: acquiring a code-block of the reference frame corresponding to the frame to be encoded and decoded as a reference code-block; acquiring coordinate information of the reference code-block, and determining a encoding and decoding status of the reference code-block based on the coordinate information of the reference code-block; and determining a block synchronization result of the code-block corresponding to the frame to be encoded and decoded based on the encoding and decoding status of the reference code-block.

In an embodiment, the acquiring the coordinate information of the reference code-block, and determining the encoding and decoding status of the reference code-block based on the coordinate information of the reference code-block includes: acquiring the coordinate information of the reference code-block, detecting a relationship between the coordinate information of the reference code-block and a preset coordinate condition, and determining the encoding and decoding status of the reference code-block as a complete encoding and decoding status when the coordinate information of the reference code-block satisfies the coordinate condition.

In an embodiment, the frame synchronization result corresponds to a status of a reference frame of the frame to be encoded and decoded. The determining the encoding and decoding mode for the frame to be encoded and decoded based on the frame synchronization result includes: when the frame synchronization result corresponds to a third status of the reference frame, retransmitting the frame synchronization detection request to the synchronization node based on the frame to be encoded and decoded. The third status indicates that the reference frame corresponding to the frame to be encoded and decoded does not begin to be encoded and decoded.

In the second aspect of the present disclosure, a parallel encoding and decoding apparatus is provided, which includes: a frame synchronization detection request transmission module configured to acquire a synchronization node corresponding to a codec core, and transmit a frame synchronization detection request to the synchronization node based on a frame to be encoded and decoded; a frame synchronization result acquisition module configured to acquire a frame synchronization result corresponding to the frame synchronization detection request; and a codec module configured to determine a encoding and decoding mode for the frame to be encoded and decoded based on the frame synchronization result, and code and decode the frame to be encoded and decoded based on the encoding and decoding mode.

In the third aspect of the present disclosure, a computer device is provided, which includes a processor and a memory for storing a computer program. The processor, when executing the computer program, implements the method of any one of the above-mentioned embodiments.

In the fourth aspect of the present disclosure, a computer-readable storage medium is provided, on which a computer program is stored. When the computer program is executed by a processor, the method of any one of the above-mentioned embodiments is implemented.

In the fifth aspect of the present disclosure, a computer program product is provided, which includes a computer program. When the computer program is executed by a processor, the method of any one of the above-mentioned embodiments is implemented.

With the parallel encoding and decoding method and apparatus, the computer device, the storage medium, and the computer program product, the synchronization node corresponding to the codec core is first acquired, and the frame synchronization detection request is transmitted to the synchronization node based on the frame to be encoded and decoded. The frame synchronization result corresponding to the frame synchronization detection request is acquired. Finally, the encoding and decoding mode for the frame to be encoded and decoded is determined based on the frame synchronization result, and the frame is encoded and decoded based on the encoding and decoding mode. The encoding and decoding mode for the frame to be encoded and decoded is determined based on the frame synchronization result, and a plurality of codec cores can be employed to code and decode different frames in the same video in parallel, thereby improving the frame rate.

DETAILED DESCRIPTION

In order to make the purpose, the technical solution and advantages of the present disclosure clearer, the present disclosure will be described in further detail with reference to the accompanying drawings and embodiments. It should be appreciated that the specific embodiments described herein are merely intended to explain the present disclosure, rather than limiting the present disclosure.

In a parallel encoding and decoding method provided by an embodiment of the present disclosure, a synchronization node communicates with a codec core through a network. The synchronization node communicates and interacts with the codec core to enter a parallel encoding and decoding environment. First, the codec core may acquire a synchronization node corresponding to the codec core, and transmit a frame synchronization detection request to the synchronization node based on a frame to be encoded and decoded. The codec core may then obtain a frame synchronization result corresponding to the frame synchronization detection request from the synchronization node. Finally, the codec core may determine a encoding and decoding mode for the frame to be encoded and decoded based on the frame synchronization result, and code and decode the frame to be encoded and decoded based on the encoding and decoding mode.

The parallel encoding and decoding method provided by the embodiment of the present disclosure can be applied to a system including a synchronization node and a codec core, and implemented through the communication interaction between the synchronization node and the codec core.

Figure 1:
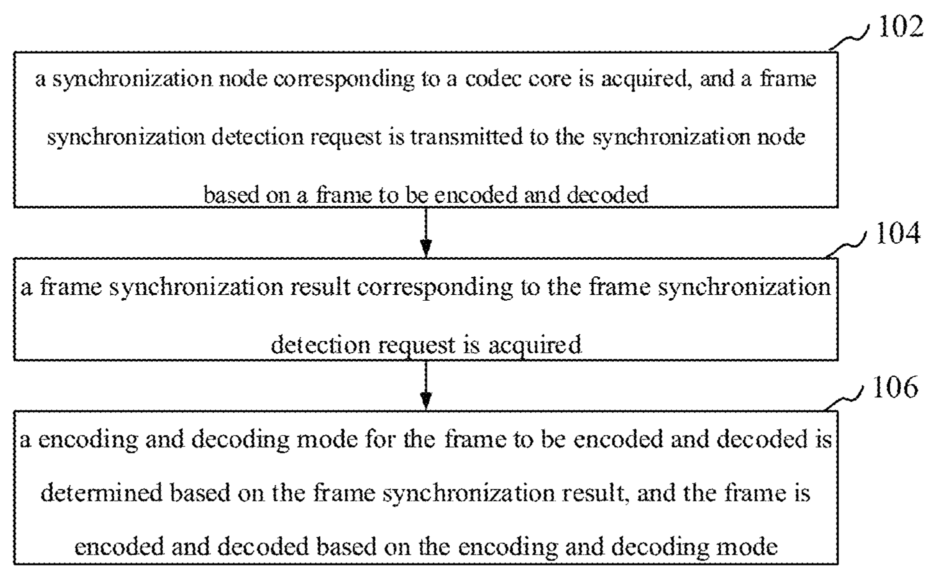
FIG. 1 is a schematic diagram illustrating an application environment for a parallel encoding and decoding method according to an embodiment of the present disclosure.

In an embodiment, as shown in FIG. 1, a parallel encoding and decoding method is provided, which is applied to a system including a synchronization node and a codec core as an example for illustration, and the method includes steps 102 through 106 as follows.

Step 102: a synchronization node corresponding to a codec core is acquired, and a frame synchronization detection request is transmitted to the synchronization node based on a frame to be encoded and decoded.

In the embodiment, each codec core has a unique corresponding synchronization node.

In the embodiment, the synchronization node may be configured to store information required for a frame synchronization. The information required for the frame synchronization may include, but is not limited to, information such as a frame identifier of a target reference frame, a codec core corresponding to encoding and decoding of the target reference frame. The target reference frame is a reference frame corresponding to the frame to be encoded and decoded.

In the embodiment, the synchronization node may store the information required for the frame synchronization by means of a Frame Sync Register (FSR).

In the embodiment, an arbiter (ARB) in the synchronization node may determine a status of the reference frame based on information in the FSR.

In the embodiment, the codec core transmits the frame synchronization detection request to the synchronization node based on the frame to be encoded and decoded, and acquires the status of the reference frame corresponding to the frame to be encoded and decoded.

Step 104: a frame synchronization result corresponding to the frame synchronization detection request is acquired.

In the embodiment, the synchronization node is configured to acquire the status of the reference frame corresponding to the frame to be encoded and decoded. Specifically, the synchronization node can acquire synchronization information corresponding to the target reference frame based on the information required for the frame synchronization stored in the FSR, and determine the status of the target reference frame based on the synchronization information corresponding to the target reference frame, that is, the status of the reference frame corresponding to the frame to be encoded and decoded.

In the embodiment, the synchronization node transmits the acquired status of the target reference frame (the status of the reference frame corresponding to the frame to be encoded and decoded) to the codec core as the frame synchronization result.

Step 106: a encoding and decoding mode for the frame to be encoded and decoded is determined based on the frame synchronization result, and the frame is encoded and decoded based on the encoding and decoding mode.

In the embodiment, the frame synchronization result may include, but is not limited to, information such as data of the reference frame, a status of the reference frame, etc.

Figure 2:
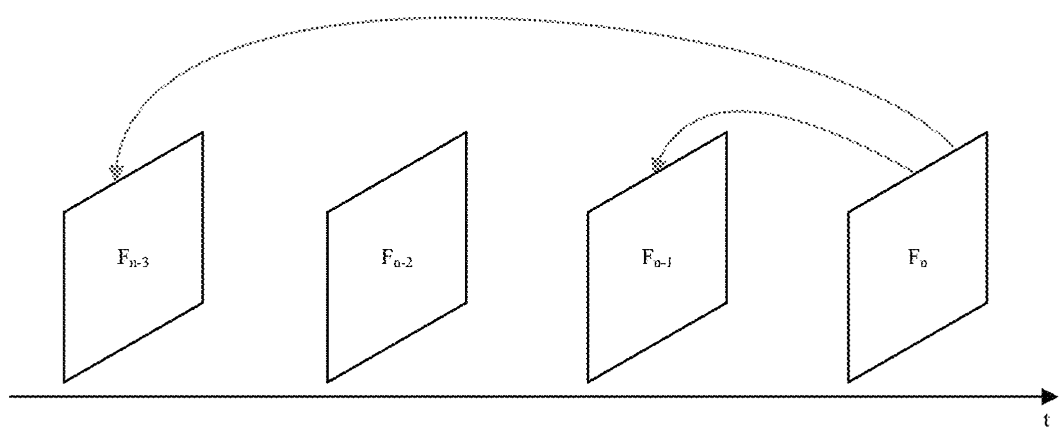
FIG. 2 is a schematic diagram illustrating data dependency relationship between different frames of the same video according to an embodiment of the present disclosure.

In the embodiment, there may exist a data dependency relationship between different frames in the same video. As shown in FIG. 2, the frame Fn needs to refer to the frame Fn-1 and frame Fn-3, that is, the frame Fn has dependencies on the frame Fn-1 and the frame Fn-3. Similarly, as shown in FIG. 2, the frame Fn does not need to refer to the frame Fn-2, accordingly there is no dependency relationship between the frame Fn and the frame Fn-2.

In the embodiment, the status of the reference frame may include, but not limited to, a first status, a second status, and a third status. The first status indicates that the reference frame corresponding to the frame to be encoded and decoded is encoded and decoded completely. The second status indicates that the frame to be encoded and decoded and the reference frame corresponding to the frame to be encoded and decoded are being encoded and decoded in parallel. The third status indicates that the reference frame corresponding to the frame to be encoded and decoded is not encoded and decoded.

In the embodiment, the codec core may determine the encoding and decoding mode for the frame to be encoded and decoded based on the status of the reference frame in the frame synchronization result, and code and decode the frame based on the encoding and decoding mode.

In the embodiment, when the frame Fn-3 is a reference frame of the frame Fn, the frame Fn is a frame to be encoded and decoded, and the frame Fn-3 is encoded and decoded completely, the encoding and decoding mode for the frame Fn may be determined based on the data of the frame Fn-3, and the frame Fn is encoded and decoded based on the encoding and decoding mode.

In the parallel encoding and decoding method, the synchronization node corresponding to the codec core is first acquired, and the frame synchronization detection request is transmitted to the synchronization node based on the frame to be encoded and decoded. The frame synchronization result corresponding to the frame synchronization detection request is acquired. Finally, the encoding and decoding mode for the frame to be encoded and decoded is determined based on the frame synchronization result, and the frame is encoded and decoded based on the encoding and decoding mode. The encoding and decoding mode for the frame to be encoded and decoded is determined based on the frame synchronization result, and a plurality of codec cores can be employed to code and decode different frames in the same video in parallel, thereby improving the frame rate.

In some embodiments, the frame synchronization result corresponds to the status of the reference frame of the frame to be encoded and decoded. The step of determining the encoding and decoding mode for the frame to be encoded and decoded based on the frame synchronization result, and encoding and decoding the frame based on the encoding and decoding mode may include: when the frame synchronization result corresponds to a first status of the reference frame, data of the reference frame corresponding to the frame to be encoded and decoded is acquired, and the frame is encoded and decoded based on the data of the reference frame. The first status indicates that the reference frame corresponding to the frame to be encoded and decoded is encoded and decoded completely.

In the embodiment, the frame synchronization result may include, but not limited to, information such as data of the reference frame, the status of the reference frame, etc.

In the embodiment, the data of the reference frame may include, but is not limited to, information such as the frame identifier of the target reference frame, the codec core corresponding to the encoding and decoding of the target reference frame, and data of encoding and decoding of the target reference frame, etc. The target reference frame is a reference frame corresponding to the frame to be encoded and decoded.

In the embodiment, when the frame synchronization result corresponds to the first status of the reference frame, it is indicated that the reference frame corresponding to the frame to be encoded and decoded is encoded and decoded completely, and the frame to be encoded and decoded may be encoded and decoded based on the data of the reference frame that encoded and decoded completely.

In some embodiments, the frame synchronization result corresponds to the status of the reference frame of the frame to be encoded and decoded. The step of determining the encoding and decoding mode for the frame to be encoded and decoded based on the frame synchronization result, and encoding and decoding the frame to be encoded and decoded based on the encoding and decoding mode may include: when the frame synchronization result corresponds to the second status of the reference frame, a block synchronization detection is performed on a code-block corresponding to the frame to be encoded and decoded, to obtain a block synchronization result. The second status indicates that the frame to be encoded and decoded and the reference frame corresponding to the frame to be encoded and decoded are being encoded and decoded in parallel. When the block synchronization result satisfies a preset condition, data of the reference frame corresponding to the frame to be encoded and decoded is acquired, and the frame to be encoded and decoded is encoded and decoded based on the data of the reference frame.

In the embodiment, when the frame Fn is a frame to be encoded and decoded, the frame Fn-1 is a reference frame of the frame Fn, and the frame Fn and the frame Fn-1 are encoded and decoded on two codec cores in parallel, the block synchronization detection is performed on the code-block corresponding to the frame Fn to obtain the block synchronization result.

In the embodiment, the code-block of the reference frame corresponding to the frame to be encoded and decoded can serve as a reference code-block.

In the embodiment, the block synchronization result may include, but is not limited to, frame data of a reference area, a encoding and decoding status of the reference area. The reference area refers to an area where the reference code-block is located, and position information of the reference area is position information of the reference code-block.

Figure 3:
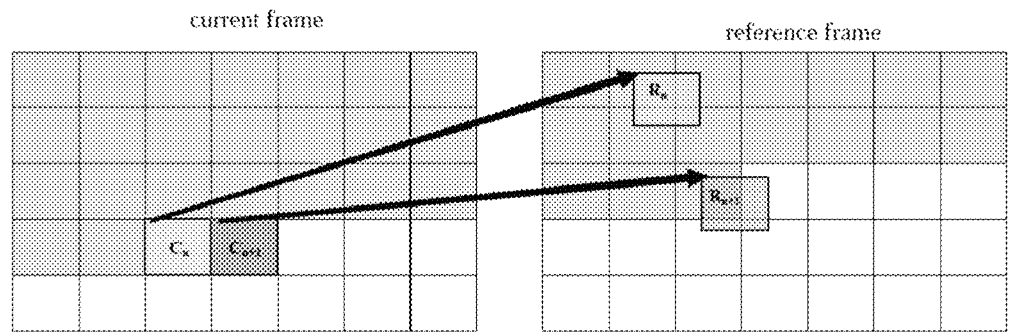
FIG. 3 is a schematic diagram of a reference area according to an embodiment of the present disclosure.

In the embodiment, the video image is encoded and decoded in units of code-blocks, and the reference areas required for different code-blocks are different. As shown in FIG. 3, the shaded portions represent code-blocks that are encoded and decoded completely, and the non-shaded portions represent code-blocks on which the encoding and decoding does not begin. Cn and Cn+1 respectively represent two code-blocks to be encoded and decoded in a current frame, Rn represents a reference area required by Cn in the reference frame, and Rn+1 represents a reference area required by Cn+1 in the reference frame.

In the embodiment, the data of the reference area may include, but is not limited to, information such as a frame identifier of a frame where the reference area is located, a codec core corresponding to the encoding and decoding of the frame where the reference area is located, encoding and decoding data of the reference area, etc.

In the embodiment, the encoding and decoding status of the reference area may include, but is not limited to, a complete encoding and decoding status, an incomplete encoding and decoding status, etc. When the encoding and decoding status of the reference area is the completed encoding and decoding status, it means that all pixels in the reference area are encoded and decoded completely. When the encoding and decoding status of the reference area is the incomplete encoding and decoding status, it means that there exists at least one pixel in the reference area which is not encoded and decoded completely.

In the embodiment, when the frame synchronization result corresponds to the second status of the reference frame, the codec core can transmit a block synchronization detection request to the synchronization node to request the synchronization node to perform the block synchronization detection on the code-block corresponding to the frame to be encoded and decoded, to obtain the block synchronization result.

In the embodiment, when the encoding and decoding status of the reference area in the block synchronization result is the complete encoding and decoding status, the codec core may acquire the pixel data of the reference area, serve the pixel data of the reference area as the data of the reference frame, and code and decode the frame to be encoded and decoded based on the data of the reference frame.

In some embodiments, the step of performing the block synchronization detection on the code-block corresponding to the frame to be encoded and decoded to obtain the block synchronization result may include: the code-block of the reference frame corresponding to the frame to be encoded and decoded is acquired as a reference code-block; coordinate information of the reference code-block is acquired, and a encoding and decoding status of the reference code-block is determined based on the coordinate information of the reference code-block; the block synchronization result of the code-block corresponding to the frame to be encoded and decoded is determined based on the encoding and decoding status of the reference code-block.

In the embodiment, the codec core records coordinate information corresponding to a block which is completely encoded and decoded every time the encoding and decoding of the block is completed.

In the embodiment, when recording the coordinate information corresponding to the block which is completely encoded and decoded, the codec core may update the encoding and decoding status corresponding to the block which is completely encoded and decoded to the complete encoding and decoding status. If all blocks in the current frame to be encoded and decoded are completely encoded and decoded, the encoding and decoding status corresponding to the current frame to be encoded and decoded is updated to the complete encoding and decoding status.

In the embodiment, when the encoding and decoding status of the reference code-block is the complete encoding and decoding status, the codec core may acquire the pixel data corresponding to the reference code-block, serve the pixel data corresponding to the reference code-block as the reference frame data, and code and decode the frame to be encoded and decoded based on the reference frame data.

In some embodiments, the step of acquiring the coordinate information of the reference code-block and determining the encoding and decoding status of the reference code-block based on the coordinate information of the reference code-block may include: the coordinate information of the reference code-block is acquired, a relationship between the coordinate information of the reference code-block and a preset coordinate condition is detected; when the coordinate information of the reference code-block satisfies the coordinate condition, the encoding and decoding status of the reference code-block is determined as the complete encoding and decoding status.

In the embodiment, the codec core may store the coordinate information corresponding to the block which is completely encoded and decoded into the Code-Block Sync Register (CSR) for easy querying.

In the embodiment, the Arbiter (ARB) in the codec core may determine whether the coordinate information of the reference code-block satisfies the coordinate condition based on information in the CSR.

In the embodiment, the preset coordinate condition may be determined based on the coordinate information (of the reference area) of the code-block which is completely encoded and decoded.

In the embodiment, the relationship between the coordinate information of the reference code-block (corresponding to a coordinate set A) and the coordinate information of the code-block which is completely encoded and decoded (corresponding to a coordinate set B) may include, but is not limited to, $A \cap B \neq A$ and $A \cap B \neq B$ and $A \cap B \neq \emptyset$ (A and B have an intersection, A is not included in B and B is not included in A), $A \cap B = A$ (A is included in B).

In another embodiment, an image may be partitioned into a number of rectangular areas.

Figure 4:
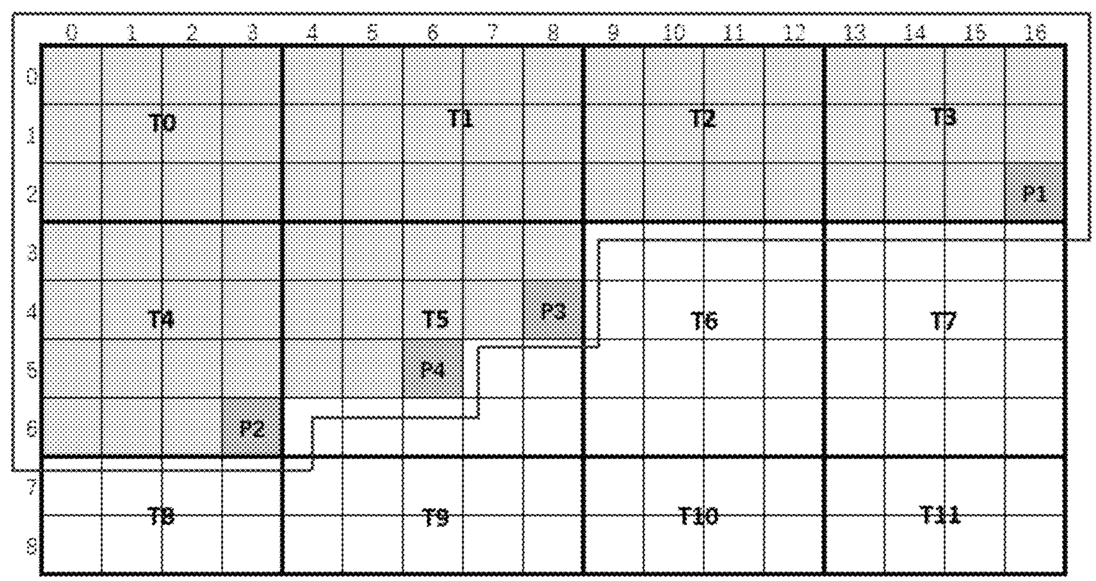
FIG. 4 is a schematic diagram illustrating positions of P1 to P4 according to an embodiment of the present disclosure.

In the embodiment, as shown in FIG. 4, the code-block (CB) in the shaded portion represents a CB which is completely encoded and decoded, and the CB in the non-shaded portion represents a CB which is not completely encoded and decoded. A coordinate of the last CB in the last CB line of all CB lines which are completely encoded and decoded is denoted as P1. A coordinate of the last CB in a previous rectangular area in which the CBs are completely encoded and decoded is denoted as P2. In a current rectangular area, a coordinate of the last CB in the last CB line of all CB lines which are completely encoded and decoded is denoted as P3. A coordinate of a CB which is completely encoded and decoded currently is denoted as P4.

In the embodiment as shown in FIG. 4, a plurality of code-blocks is encoded and decoded in an order from largest to smallest (T0 to T11). All CBs in each code-block are encoded and decoded according to a raster scan order.

In the embodiment, the codec core may determine a code-block area in which all code-blocks are completely encoded and decoded through stored coordinate information corresponding to blocks at a plurality of specific positions. The coordinate information corresponding to the blocks at the specific positions may include the above-mentioned P1, P2, P3, and P4 respectively.

In the embodiment, when the coordinate information corresponding to the blocks at the specific positions includes P1, P2, P3 and P4, a code-block area in which all code-blocks are completely encoded and decoded may be formed based on P1, P2, P3, and P4, that is, the coordinate information of code-blocks which are completely encoded and decoded. The encoding and decoding mode for the frame to be encoded and decoded can be determined based on the position relationship between the coordinate information of the reference code-block and the coordinate information of the code-block which is completely encoded and decoded; and the frame to be encoded and decoded can be encoded and decoded based on the encoding and decoding mode.

Figure 5:
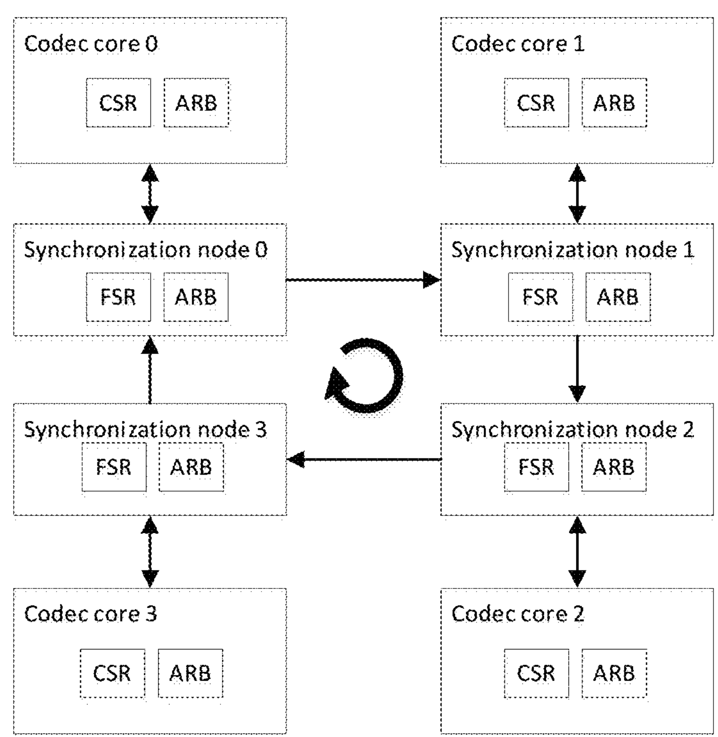
FIG. 5 is a schematic diagram illustrating a loop broadcast among four synchronization nodes according to an embodiment of the present disclosure.

In the embodiment, as shown in FIG. 5, four codec cores (including a codec core 0, a codec core 1, a codec core 2, and a codec core 3) are taken as an example. The codec core 0 corresponds to the synchronization node 0, the codec core 1 corresponds to the synchronization node 1, the codec core 2 corresponds to the synchronization node 2, and the codec core 3 corresponds to the synchronization node 3. Each codec core can broadcast the stored coordinate information corresponding to the blocks at the specific positions (for example, P1, P2, P3, and P4) to other codec cores via the synchronization nodes.

In the embodiment, each codec core may receive, by the broadcasting, the coordinate information corresponding to the blocks at specific positions transmitted by other codec cores, and obtain a set of coordinate information corresponding to the blocks at the specific positions, and determine a code-block area in the reference frame in which all code-blocks are completely encoded and decoded based on the set of coordinate information corresponding to the blocks at the specific positions, i.e., the coordinate information of the code-blocks which are completely encoded and decoded.

In the embodiment, when an additional codec core is required to add, a set of codec core and synchronization node may be added to the loop shown in FIG. 5. When it is necessary to reduce the codec cores, a set of codec core and synchronization node may be deleted from the loop shown in FIG. 5.

In the embodiment, when the relationship between the coordinate information of the reference code-block (corresponding to the coordinate set A) and the coordinate information of the code-blocks which are completely encoded and decoded (corresponding to the coordinate set B) is that A is included in B, which means that when the encoding and decoding status of the reference code-block is the complete encoding and decoding status, the codec core may acquire the pixel data corresponding to the reference code-block, and serve the pixel data corresponding to the reference code-block as the reference frame data, and code and decode the frame to be encoded and decoded based on the reference frame data.

In another embodiment, when the relationship between the coordinate information of the reference code-block (corresponding to the coordinate set A) and the coordinate information of the code-blocks which are completely encoded and decoded (corresponding to the coordinate set B) is that the set A intersects the set B, where A is not included in B and B is not included in A, which means that when the encoding and decoding status of the reference code-block is the incomplete encoding and decoding status, the codec core may not acquire the frame data corresponding to the reference code-block until the set A is included in the set B, and serve the pixel data corresponding to the reference code-block as the reference frame data, and code and decode the frame to be encoded and decoded based on the reference frame data.

In some embodiments, the frame synchronization result corresponds to the status of the reference frame of the frame to be encoded and decoded; the step of determining the encoding and decoding mode for the frame to be encoded and decoded based on the frame synchronization result may include: when the frame synchronization result corresponds to a third status of the reference frame, the frame synchronization detection request is retransmitted to the synchronization node based on the frame to be encoded and decoded. The third status indicates that the reference frame corresponding to the frame to be encoded and decoded does not begin to be encoded and decoded.

In the embodiment, as shown in FIG. 2, when there is no dependency relationship between the frame Fn and the frame Fn-2, the frame Fn is a frame to be encoded and decoded. When the frame Fn and the frame Fn-2 are encoded and decoded on two codec cores in parallel, since the frame Fn-2 is being encoded and decoded, it can be seen definitely from the time axis in FIG. 2 that the encoding and decoding of the frame Fn-1 does not begin (i.e., the third status), accordingly the frame Fn cannot refer to the data of the frame Fn-1.

Figure 6:
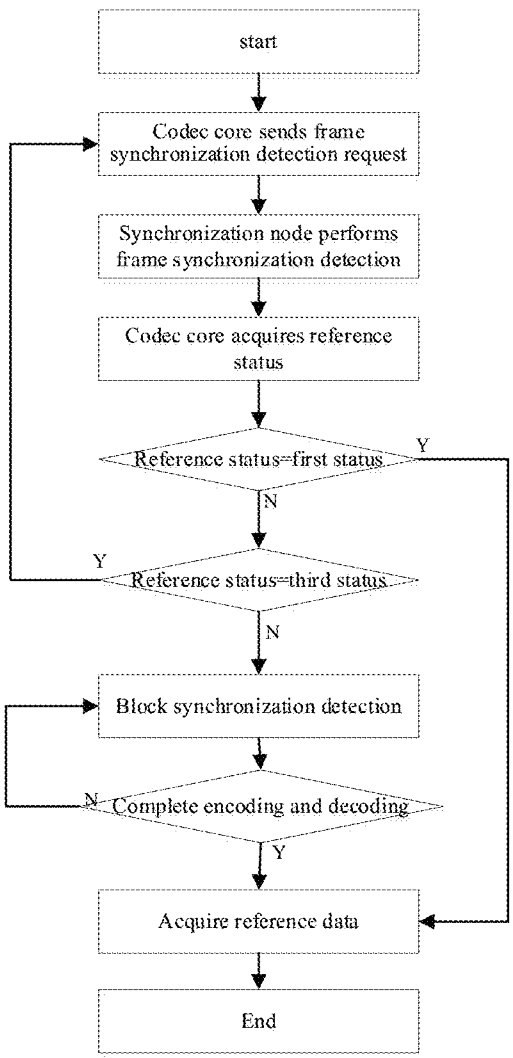
FIG. 6 is a flow chart showing a frame synchronization detection method according to an embodiment of the present disclosure.

In the embodiment, as shown in FIG. 6, when the frame synchronization result corresponds to the third status of the reference frame, the codec core may retransmit the frame synchronization detection request to the synchronization node based on the frame to be encoded and decoded until the frame synchronization result corresponds to the first or second status of the reference frame.

In some embodiments, the FSR in the synchronization node is configured to store information required for the frame synchronization. For example, an FSR in a synchronization node can store FSR.FrameID, FSR.Ref[i].FrameID, and FSR.Ref[i].CoreID. The FSR.FrameID represents a unique identifier FrameID corresponding to the frame to be encoded and decoded, the FSR.Ref[i].FrameID represents a unique identifier FrameID of the i-th reference frame of the frame to be encoded and decoded, where $0 \le i \le 14$, and the FSR.Ref[i]. CoreID represents a unique identifier CoreID of the codec core corresponding to the i-th reference frame of the frame to be encoded and decoded.

In the embodiment, when the CoreID of the codec core in which the frame to be encoded and decoded is located is CID0, and a serial number of a reference frame required by the code-block currently to be processed is RefID, the codec core VideoCore[CID0] transmits the frame synchronization detection request to the synchronization node SyncNode [CID0]. The frame synchronization detection request may include the serial number RefID of the reference frame.

In the embodiment, the synchronization node SyncNode [CID0] may receive the frame synchronization detection request, and let: CID1=FSR.Ref[RefID].CoreID, FID1=FSR.Ref[RefID].FrameID, and may broadcast the FID1 to the corresponding synchronization node SyncNode [CID1] through a loop broadcast among a plurality of synchronization nodes. The synchronization node SyncNode

[CID1] may determine the status of the reference frame based on the sizes of FID1 and SyncNode[CID1], as shown in Table (1):

TABLE 1

| conditions | Status of reference frame |
|---|---|
| FID1 < SyncNode[CID1]. FSR.FrameID | First status |
| FID1 = SyncNode[CID1]. FSR.FrameID | Second status |
| FID1 > SyncNode[CID1]. FSR.FrameID | Third status |

In the embodiment, after obtaining the status of the reference frame, the synchronization node SyncNode[CID1] may transmit the status of the reference frame to the synchronization node SyncNode[CID0] through a loop broadcast among the plurality of synchronization nodes. Further, the synchronization node SyncNode[CID0] returns the status and the CoreID of the reference frame to the codec core VideoCore[CID0].

In some embodiments, when the frame synchronization result corresponds to the second status of the reference frame, the codec core performs the block synchronization detection on the code-block corresponding to the frame to be encoded-decoded to obtain the block synchronization result.

In the embodiment, the codec core may update the coordinate information (e.g., P1, P2, P3, and P4) corresponding to the frames at the specific positions when a code-block is completely encoded and decoded.

In the embodiment, P1 is updated when the last CB of a CB line of one pixel segment (for example, the portion from T1 to T3 in FIG. 4 is one pixel segment) is completely encoded and decoded, P2 is updated when the last CB in the CB line in a rectangular area in FIG. 4 is completely encoded and decoded, P3 is updated when the last CB in a rectangular area in FIG. 4 is completely encoded and decoded, and P4 is updated when the current CB is completely encoded and decoded.

In the embodiment, the codec core may update the P1 to P4 data before transmitting the P1 to P4 data to other synchronization nodes through the loop broadcast among the plurality of synchronization nodes based on the synchronization node corresponding to the codec core; and the synchronization nodes then return the updated P1 to P4 data to respectively corresponding codec cores, so that each codec core can acquire the P1 to P4 data on the other codec cores.

In the embodiment, after a current codec core receives the P1 to P4 data from other codec cores, and when the CoreID of other codec cores is CID, the current codec core stores the P1 to P4 data in CSR[CID].

Figure 7:
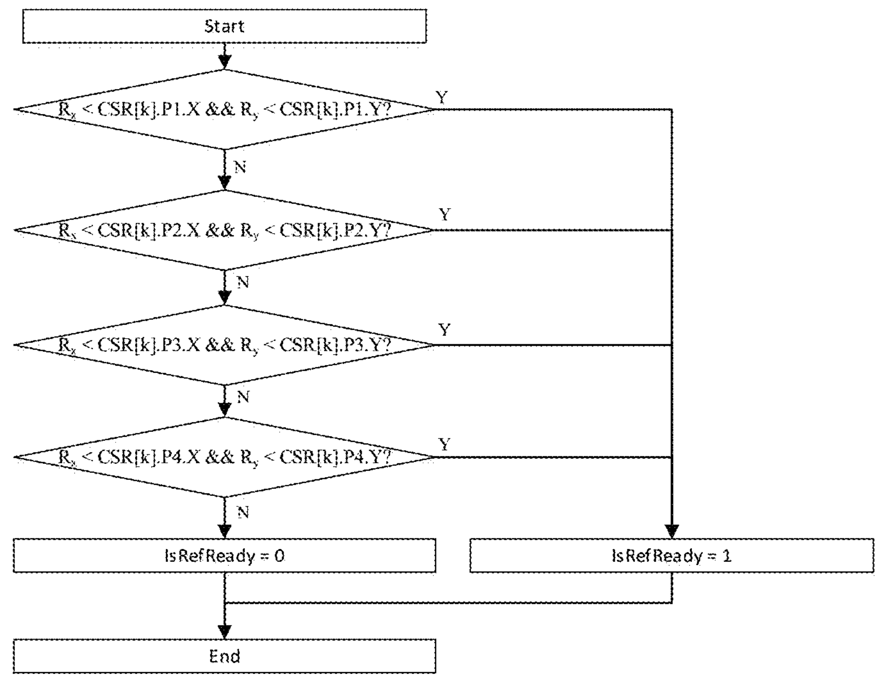
FIG. 7 is a flow chart showing a block synchronization detection method according to an embodiment of the present disclosure.

In the embodiment, as shown in FIG. 7, when the current codec core needs to perform the block synchronization detection, the required reference area is obtained first, and then a coordinate of a pixel in the lower right corner of the reference area is obtained and marked as (Rx, Ry). The codec core where the reference frame is located is provided with CoreID=k. When IsRefReady=0, the parameter data is determined to be unavailable. When IsRefReady=1, it is indicated that parameter data is determined to be unavailable. The IsRefReady represents the relationship between the coordinate information (A) of the required reference code-block and the coordinate information (B) of the code-block which is completely encoded and decoded. Specifically, that IsRefReady=0 indicates that the set A intersects the set B, and the set A is not included in the set B and the set B is not included in the set A. That IsRefReady=1 indicates that the set A is contained in the set B.

It should be understood that although the steps in the flow charts of the embodiments described above are shown sequentially as indicated by the arrows, these steps are not definitely performed sequentially in the order indicated by the arrows. Unless specifically stated herein, the execution of these steps is not strictly limited in order, i.e., these steps may be performed in other orders. Further, at least part of the steps in the flow charts as described in the embodiments described above may include a plurality of steps or stages that may not definitely be performed at the same moment, but may be performed at different moments; and the steps or stages may not definitely be performed sequentially, but may be performed in turns or alternately with other steps or with at least part of the steps or stages of other steps.

Based on the same inventive concept, a parallel encoding and decoding apparatus configured to implement the above-mentioned parallel encoding and decoding method is provided in an embodiment of the present disclosure. The implementation solution for solving the technical problem provided by the apparatus is similar to the implementation solution described in the above-mentioned method, so that as for specific limitations in one or more embodiments of the parallel encoding and decoding apparatus provided below, reference can be made to the foregoing limitations of the parallel encoding and decoding method, which is not repeated herein.

Figure 8:
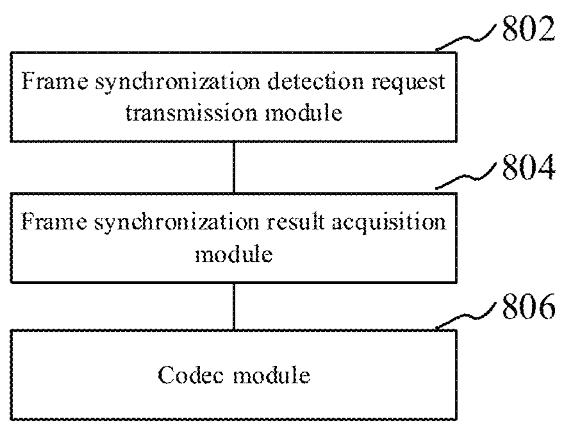
FIG. 8 is a block diagram illustrating a structure of a parallel encoding and decoding apparatus according to an embodiment of the present disclosure.

In an embodiment, as shown in FIG. 8, a parallel encoding and decoding apparatus is provided, which includes: a frame synchronization detection request transmission module 802, a frame synchronization result acquisition module 804, and a codec module 806.

The frame synchronization detection request transmission module 802 is configured to acquire a synchronization node corresponding to a codec core, and transmit a frame synchronization detection request to the synchronization node based on a frame to be encoded and decoded.

The frame synchronization result acquisition module 804 is configured to acquire a frame synchronization result corresponding to the frame synchronization detection request.

The codec module 806 is configured to determine a encoding and decoding mode for the frame to be encoded and decoded based on the frame synchronization result, and code and decode the frame to be encoded and decoded based on the encoding and decoding mode.

In an embodiment, the frame synchronization result corresponds to a status of a reference frame of the frame to be encoded and decoded, and the codec module 806 may further include: a first codec submodule configured to, when the frame synchronization result corresponds to a first status of the reference frame, acquire data of the reference frame corresponding to the frame to be encoded and decoded, and code and decode the frame to be encoded and decoded based on the data of the reference frame. The first status indicates that the reference frame corresponding to the frame to be encoded and decoded is encoded and decoded completely.

In an embodiment, the frame synchronization result corresponds to the status of the reference frame of the frame to be encoded and decoded, and the codec module 806 may further include: a block synchronization detection submodule configured to, when the frame synchronization result corresponds to the second status of the reference frame, perform a block synchronization detection on a code-block corresponding to the frame to be encoded and decoded to obtain a block synchronization result, in which the second status indicates that the frame to be encoded and decoded and the reference frame corresponding to the frame to be encoded and decoded are being encoded and decoded in parallel; and a second codec submodule configured to, when the block synchronization result satisfies a preset condition, acquire the data of the reference frame corresponding to the frame to be encoded and decoded, and code and decode the frame to be encoded and decoded based on the data of the reference frame.

In an embodiment, the block synchronization detection submodule may further include: a reference code-block determination unit configured to acquire a position of a reference block in the reference frame required by the block to be encoded and decoded as a reference code-block; a encoding and decoding status determination unit, configured to acquire coordinate information of the reference code-block, and determine a encoding and decoding status of the reference code-block based on the coordinate information of the reference code-block; and a block synchronization result determination unit, configured to determine the block synchronization result of the code-block corresponding to the frame to be encoded and decoded based on the encoding and decoding status of the reference code-block.

In an embodiment, the encoding and decoding status determination unit may further include: a coordinate detection subunit configured to acquire the coordinate information of the reference code-block, detect a relationship between the coordinate information of the reference code-block and a preset coordinate condition, and determine the encoding and decoding status of the reference code-block as the complete encoding and decoding status when the coordinate information of the reference code-block satisfies the coordinate condition.

In an embodiment, the frame synchronization result corresponds to the status of the reference frame of the frame to be encoded and decoded; and the codec module 806 may further include: a third codec submodule, configured to, when the frame synchronization result corresponds to a third status of the reference frame, retransmit the frame synchronization detection request to the synchronization node based on the frame to be encoded and decoded, in which the third status indicates that the reference frame corresponding to the frame to be encoded and decoded does not begin to be encoded and decoded.

Various modules of the above-mentioned parallel encoding and decoding apparatus may be implemented in whole or in part by software, hardware, and combinations thereof. The above-mentioned various modules may be embedded in hardware or independently of the processor in the computer device, or may be stored in software in the memory of the computer device to facilitate the processor to invoke and perform operations corresponding to the above various modules.

Figure 9:
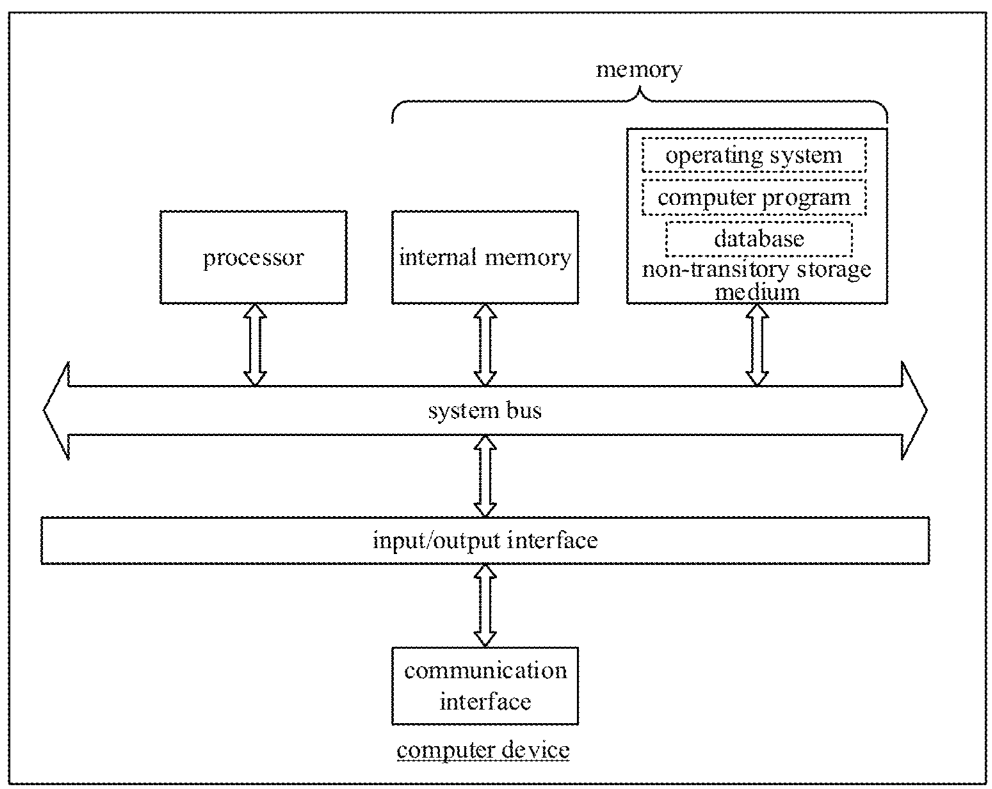
FIG. 9 is an internal structure diagram of a computer device according to an embodiment of the present disclosure.

In an embodiment, a computer device is provided, which may be a server, and an internal structure diagram thereof may be as shown in FIG. 9. The computer device includes a processor, a memory, an input/output (I/O) interface, and a communication interface. The processor, the memory and the input/output interface are connected to each through a system bus; and the communication interface is connected to the system bus through the input/output interface. The processor of the computer device is configured to provide computing and control capabilities. The memory of the computer device includes a non-transitory storage medium and an internal memory. The non-transitory storage medium stores an operating system, a computer program, and a database. The memory provides an operating environment for the operating system and the computer program in the non-transitory storage medium. The database of the computer device is configured to store data such as the frame synchronization result, the block synchronization result and the like. The input/output interface of the computer device is configured to exchange information between the processor and an external device. The communication interface of the computer device is configured to communicate with an external terminal through a network connection. The computer program is executed by the processor to implement a parallel encoding and decoding method.

Those skilled in the art may appreciate that the structure shown in FIG. 9 is merely a block diagram of a portion of the structure associated with the technical solution of the present disclosure, and does not constitute a limitation to a computer device to which the solution of the present disclosure is applied, and that a specific computer device may include more or less components than that shown in the drawings, or may combine certain components, or may have different component arrangements.

In an embodiment, a computer device is provided, which includes a processor and a memory for storing a computer program executed by the processor. The processor, when executing the computer program, implements following steps: a synchronization node corresponding to a codec core is acquired, and a frame synchronization detection request is transmitted to the synchronization node based on a frame to be encoded and decoded; a frame synchronization result corresponding to the frame synchronization detection request is acquired; a encoding and decoding mode for the frame to be encoded and decoded is determined based on the frame synchronization result, and the frame is encoded and decoded based on the encoding and decoding mode.

In an embodiment, the frame synchronization result corresponds to the status of the reference frame of the frame to be encoded and decoded, and the processor is further configured to be capable of executing the stored computer program to, when the frame synchronization result corresponds to a first status of the reference frame, acquire data of the reference frame corresponding to the frame to be encoded and decoded, and code and decode the frame based on the data of the reference frame, in which the first status indicates that the reference frame corresponding to the frame to be encoded and decoded has been encoded and decoded completely.

In an embodiment, the frame synchronization result corresponds to the status of the reference frame of the frame to be encoded and decoded, and the processor is further configured to be capable of executing the store computer program to: when the frame synchronization result corresponds to a second status of the reference frame, perform a block synchronization detection on a code-block corresponding to the frame to be encoded and decoded, obtain a block synchronization result, in which the second status indicates that the frame to be encoded and decoded and the reference frame corresponding to the frame to be encoded and decoded are being encoded and decoded in parallel; when the block synchronization result satisfies a preset condition, acquire data of the reference frame corresponding to the frame to be encoded and decoded, and code and decode the frame to be encoded and decoded based on the data of the reference frame.

In an embodiment, the processor is further configured to be capable of executing the store computer program to: acquire a code-block of the reference frame corresponding to the frame to be encoded and decoded as a reference code-block, acquire coordinate information of the reference code-block, determine a encoding and decoding status of the reference code-block based on the coordinate information of the reference code-block, determine the block synchronization result of the code-block corresponding to the frame to be encoded and decoded based on the encoding and decoding status of the reference code-block.

In an embodiment, the processor is further configured to be capable of executing the store computer program to: acquire the coordinate information of the reference code-block, detect a relationship between the coordinate information of the reference code-block and a preset coordinate condition, and determine the encoding and decoding status of the reference code-block as the complete encoding and decoding status when the coordinate information of the reference code-block satisfies the coordinate condition.

In an embodiment, the frame synchronization result corresponds to the status of the reference frame of the frame to be encoded and decoded. the processor is further configured to be capable of executing the store computer program to: when the frame synchronization result corresponds to a third status of the reference frame, retransmit the frame synchronization detection request to the synchronization node based on the frame to be encoded and decoded, in which the third status indicates that the reference frame corresponding to the frame to be encoded and decoded does not begin to be encoded and decoded.

In an embodiment, a computer-readable storage medium is provided, on which a computer program is stored. The computer program is executed by a processor to implement the following steps: a synchronization node corresponding to a codec core is acquired, and a frame synchronization detection request is transmitted to the synchronization node based on a frame to be encoded and decoded; a frame synchronization result corresponding to the frame synchronization detection request is acquired; a encoding and decoding mode for the frame to be encoded and decoded is determined based on the frame synchronization result, and the frame is encoded and decoded based on the encoding and decoding mode.

In an embodiment, the frame synchronization result corresponds to the status of the reference frame of the frame to be encoded and decoded, and the processor is further configured to be capable of executing the stored computer program to, when the frame synchronization result corresponds to a first status of the reference frame, acquire data of the reference frame corresponding to the frame to be encoded and decoded, and code and decode the frame based on the data of the reference frame, in which the first status indicates that the reference frame corresponding to the frame to be encoded and decoded has been encoded and decoded completely.

In an embodiment, the frame synchronization result corresponds to the status of the reference frame of the frame to be encoded and decoded, and the processor is further configured to be capable of executing the store computer program to: when the frame synchronization result corresponds to a second status of the reference frame, perform a block synchronization detection on a code-block corresponding to the frame to be encoded and decoded, obtain a block synchronization result, in which the second status indicates that the frame to be encoded and decoded and the reference frame corresponding to the frame to be encoded and decoded are being encoded and decoded in parallel; and when the block synchronization result satisfies a preset condition, acquire data of the reference frame corresponding to the frame to be encoded and decoded, and code and decode the frame to be encoded and decoded based on the data of the reference frame.

In an embodiment, the processor is further configured to be capable of executing the store computer program to: acquire a code-block of the reference frame corresponding to the frame to be encoded and decoded as a reference code-block, acquire coordinate information of the reference code-block, determine a encoding and decoding status of the reference code-block based on the coordinate information of the reference code-block, and determine the block synchronization result of the code-block corresponding to the frame to be encoded and decoded based on the encoding and decoding status of the reference code-block.

In an embodiment, the processor is further configured to be capable of executing the store computer program to: acquire the coordinate information of the reference code-block, detect a relationship between the coordinate information of the reference code-block and a preset coordinate condition, and determine the encoding and decoding status of the reference code-block as the complete encoding and decoding status when the coordinate information of the reference code-block satisfies the coordinate condition.

In an embodiment, the frame synchronization result corresponds to the status of the reference frame of the frame to be encoded and decoded. the processor is further configured to be capable of executing the store computer program to: when the frame synchronization result corresponds to a third status of the reference frame, retransmit the frame synchronization detection request to the synchronization node based on the frame to be encoded and decoded, in which the third status indicates that the reference frame corresponding to the frame to be encoded and decoded does not begin to be encoded and decoded.

In an embodiment, a computer program product is provided, which includes a computer program, and the computer program is executed by a processor to implement the following steps: a synchronization node corresponding to a codec core is acquired, and a frame synchronization detection request is transmitted to the synchronization node based on a frame to be encoded and decoded; a frame synchronization result corresponding to the frame synchronization detection request is acquired; a encoding and decoding mode for the frame to be encoded and decoded is determined based on the frame synchronization result, and the frame is encoded and decoded based on the encoding and decoding mode.

In an embodiment, the frame synchronization result corresponds to the status of the reference frame of the frame to be encoded and decoded; and the processor is further configured to be capable of executing the stored computer program to, when the frame synchronization result corresponds to a first status of the reference frame, acquire data of the reference frame corresponding to the frame to be encoded and decoded, and code and decode the frame based on the data of the reference frame, in which the first status indicates that the reference frame corresponding to the frame to be encoded and decoded is encoded and decoded completely.

In an embodiment, the frame synchronization result corresponds to the status of the reference frame of the frame to be encoded and decoded; and the processor is further configured to be capable of executing the store computer program to: when the frame synchronization result corresponds to a second status of the reference frame, perform a block synchronization detection on a code-block corresponding to the frame to be encoded and decoded, obtain a block synchronization result, in which the second status indicates that the frame to be encoded and decoded and the reference frame corresponding to the frame to be encoded and decoded are being encoded and decoded in parallel; and when the block synchronization result satisfies a preset condition, acquire data of the reference frame corresponding to the frame to be encoded and decoded, and code and decode the frame to be encoded and decoded based on the data of the reference frame.

In an embodiment, the processor is further configured to be capable of executing the store computer program to: acquire a code-block of the reference frame corresponding to the frame to be encoded and decoded as a reference code-block, acquire coordinate information of the reference code-block, determine a encoding and decoding status of the reference code-block based on the coordinate information of the reference code-block, and determine the block synchronization result of the code-block corresponding to the frame to be encoded and decoded based on the encoding and decoding status of the reference code-block.

In an embodiment, the processor is further configured to be capable of executing the store computer program to: acquire the coordinate information of the reference code-block, detect a relationship between the coordinate information of the reference code-block and a preset coordinate condition, and determine the encoding and decoding status of the reference code-block as the complete encoding and decoding status when the coordinate information of the reference code-block satisfies the coordinate condition.

In an embodiment, the frame synchronization result corresponds to the status of the reference frame of the frame to be encoded and decoded. the processor is further configured to be capable of executing the store computer program to: when the frame synchronization result corresponds to a third status of the reference frame, retransmit the frame synchronization detection request to the synchronization node based on the frame to be encoded and decoded, in which the third status indicates that the reference frame corresponding to the frame to be encoded and decoded does not begin to be encoded and decoded.

It should be noted that the user information (including but not limited to user device information, user personal information, etc.) and data (including but not limited to data for analysis, stored data, displayed data, etc.) involved in the present disclosure are all information and data authorized by the user or fully authorized by all parties, and the collection, use and processing of relevant data need to comply with relevant laws, regulations and standards of relevant countries and regions.

Those of ordinary skill in the art can understand that all or part of the procedures in the method of the above embodiments can be implemented by instructing relevant hardware through a computer program, and the computer program can be stored in a non-transitory computer-readable storage medium, when the computer program is executed, the procedures in the above-mentioned method embodiments can be performed. Any reference to a memory, a database or other media used in the various embodiments provided in the present disclosure may include at least one of a non-transitory memory and a transitory memory. The non-transitory memory may include a read-only memory (ROM), a magnetic tape, a floppy disk, a flash memory, an optical memory, a high-density embedded non-transitory memory, a resistive memory (ReRAM), a magnetoresistive random access memory (MRAM), a ferroelectric random access memory (FRAM), a phase change memory (PCM), a graphene memory, etc. The transitory memory may include a random access memory (RAM) or an external cache memory, and the like. As an illustration and not a limitation, the RAM may be in various forms, such as a static random access memory (SRAM) or a dynamic random access memory (DRAM). The database involved in the various embodiments provided in the present disclosure may include at least one of a relational database and a non-relational database. The non-relational database may include a tile-chain-based distributed database, etc., but is not limited thereto. The processor involved in the various embodiments provided in the present disclosure may be a general-purpose processor, a central processing unit, a graphics processor, a digital signal processor, a programmable logic device, a data processing logic device based on quantum computation, etc., but is not limited thereto.

The technical limitations in the above embodiments can be combined arbitrarily. In order to make the description concise, all possible combinations of the technical limitations in the above embodiments are not described. However, as long as there is no contradiction in the combination of these technical limitations, theses combinations considered to fall within the scope of the present disclosure.

The above-mentioned embodiments merely some exemplary embodiments of the present disclosure, and the descriptions thereof are relatively specific and detailed, but should not be construed as a limitation on the scope of the present disclosure. It should be pointed out that those skilled in the art can make several modifications and improvements without departing from the concept of the present disclosure, which all belong to the protection scope of the present disclosure. Therefore, the scope of protection of the present disclosure is subject to the appended claims.

What is claimed is:

1. A parallel encoding and decoding method, comprising:

acquiring a synchronization node corresponding to a codec core, and transmitting a frame synchronization detection request to the synchronization node based on a frame to be encoded and decoded;

acquiring a frame synchronization result corresponding to the frame synchronization detection request; and determining an encoding and decoding mode for the frame to be encoded and decoded based on the frame synchronization result, and encoding and decoding the frame to be encoded and decoded based on the encoding and decoding mode;

wherein the frame synchronization result corresponds to a status of a reference frame of the frame to be encoded and decoded; and wherein the determining the encoding and decoding mode for the frame to be encoded and decoded based on the frame synchronization result, and encoding and decoding the frame to be encoded and decoded based on the encoding and decoding mode comprises:

when the frame synchronization result corresponds to a second status of the reference frame, performing a block synchronization detection on a code-block corresponding to the frame to be encoded and decoded, and obtaining a block synchronization result, wherein the second status indicates that the frame to be encoded and decoded and the reference frame corresponding to the frame to be encoded and decoded are being encoded and decoded in parallel; and when the block synchronization result satisfies a preset condition, acquiring data of the reference frame corresponding to the frame to be encoded and decoded, and encoding and decoding the frame to be encoded and decoded based on the data of the reference frame.

2. The method according to claim 1, wherein the frame synchronization result corresponds to a status of a reference frame of the frame to be encoded and decoded; and wherein the determining the encoding and decoding mode for the frame to be encoded and decoded based on the frame synchronization result, and encoding and decoding the frame to be encoded and decoded based on the encoding and decoding mode comprises:

when the frame synchronization result corresponds to a first status of the reference frame, acquiring data of the reference frame corresponding to the frame to be encoded and decoded, and encoding and decoding the frame to be encoded and decoded based on the data of the reference frame, wherein the first status indicates that the reference frame corresponding to the frame to be encoded and decoded is encoded and decoded completely.

3. The method according to claim 1, wherein the performing the block synchronization detection on the code-block corresponding to the frame to be encoded and decoded, and obtaining the block synchronization result comprises:

acquiring a code-block of the reference frame corresponding to the frame to be encoded and decoded as a reference code-block;

acquiring coordinate information of the reference code-block, and determining a encoding and decoding status of the reference code-block based on the coordinate information of the reference code-block; and determining a block synchronization result of the code-block corresponding to the frame to be encoded and decoded based on the encoding and decoding status of the reference code-block.

4. The method according to claim 3, wherein the acquiring the coordinate information of the reference code-block, and determining the encoding and decoding status of the reference code-block based on the coordinate information of the reference code-block comprises:

acquiring the coordinate information of the reference code-block, detecting a relationship between the coordinate information of the reference code-block and a preset coordinate condition, and determining the encoding and decoding status of the reference code-block as a complete encoding and decoding status when the coordinate information of the reference code-block satisfies the coordinate condition.

5. A parallel encoding and decoding apparatus, comprising:

a frame synchronization detection request transmission module configured to acquire a synchronization node corresponding to a codec core, and transmit a frame synchronization detection request to the synchronization node based on a frame to be encoded and decoded;

a frame synchronization result acquisition module configured to acquire a frame synchronization result corresponding to the frame synchronization detection request; and a codec module configured to determine a encoding and decoding mode for the frame to be encoded and decoded based on the frame synchronization result, and code and decode the frame to be encoded and decoded based on the encoding and decoding mode;

wherein the frame synchronization result corresponds to a status of a reference frame of the frame to be encoded and decoded; and wherein the determining the encoding and decoding mode for the frame to be encoded and decoded based on the frame synchronization result, and encoding and decoding the frame to be encoded and decoded based on the encoding and decoding mode comprises:

when the frame synchronization result corresponds to a second status of the reference frame, performing a block synchronization detection on a code-block corresponding to the frame to be encoded and decoded, and obtaining a block synchronization result, wherein the second status indicates that the frame to be encoded and decoded and the reference frame corresponding to the frame to be encoded and decoded are being encoded and decoded in parallel; and when the block synchronization result satisfies a preset condition, acquiring data of the reference frame corresponding to the frame to be encoded and decoded, and encoding and decoding the frame to be encoded and decoded based on the data of the reference frame.

6. A computer device, comprising a processor and a memory for storing a computer program, wherein the processor, when executing the computer program, implements the method of claim 1.

7. A computer-readable storage medium, on which a computer program is stored, wherein when the computer program is executed by a processor, the method of claim 1 is implemented.

8. A computer program product, comprising a computer program, wherein when the computer program is executed by a processor, the method of claim 1 is implemented.

9. A parallel encoding and decoding method, comprising:

acquiring a synchronization node corresponding to a codec core, and transmitting a frame synchronization detection request to the synchronization node based on a frame to be encoded and decoded;

acquiring a frame synchronization result corresponding to the frame synchronization detection request; and determining an encoding and decoding mode for the frame to be encoded and decoded based on the frame synchronization result, and encoding and decoding the frame to be encoded and decoded based on the encoding and decoding mode;

wherein the frame synchronization result corresponds to a status of a reference frame of the frame to be encoded and decoded; and wherein the determining the encoding and decoding mode for the frame to be encoded and decoded based on the frame synchronization result comprises:

when the frame synchronization result corresponds to a third status of the reference frame, retransmitting the frame synchronization detection request to the synchronization node based on the frame to be encoded and decoded, wherein the third status indicates that the reference frame corresponding to the frame to be encoded and decoded does not begin to be encoded and decoded.

* * * * *